Feb. 14, 1933.    C. C. CALKINS    1,897,361
SEED TREATING MACHINE
Filed Feb. 3, 1930    3 Sheets-Sheet 1
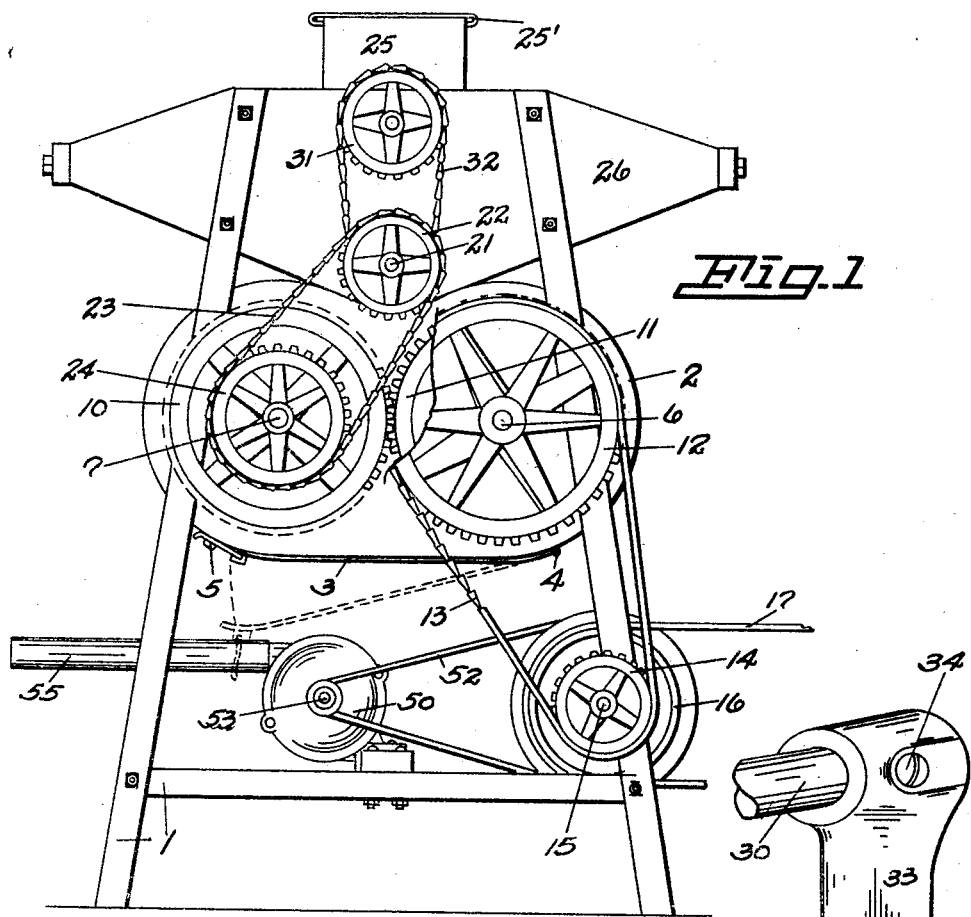
Fig.1
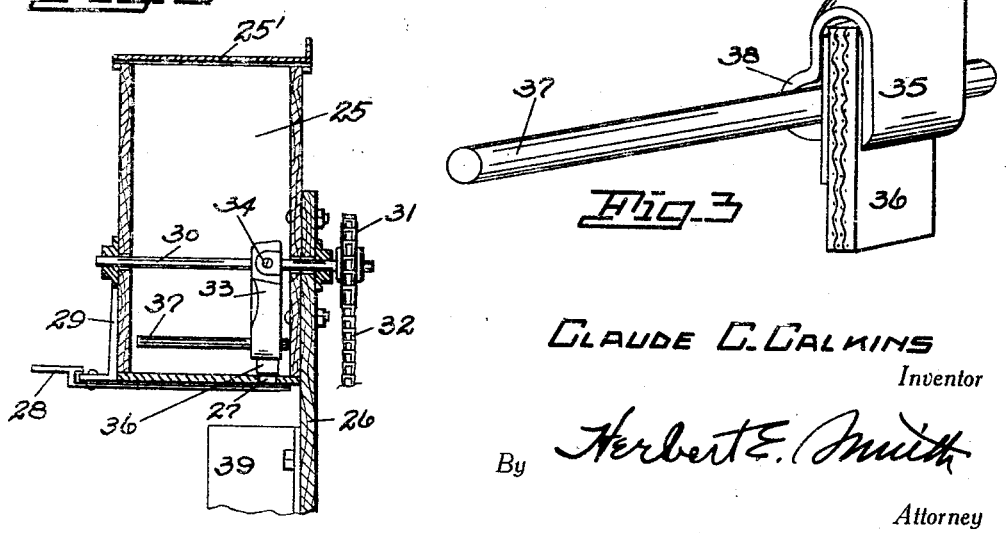
Fig.2
Fig.3
CLAUDE C. CALKINS
Inventor
By Herbert E. Smith
Attorney

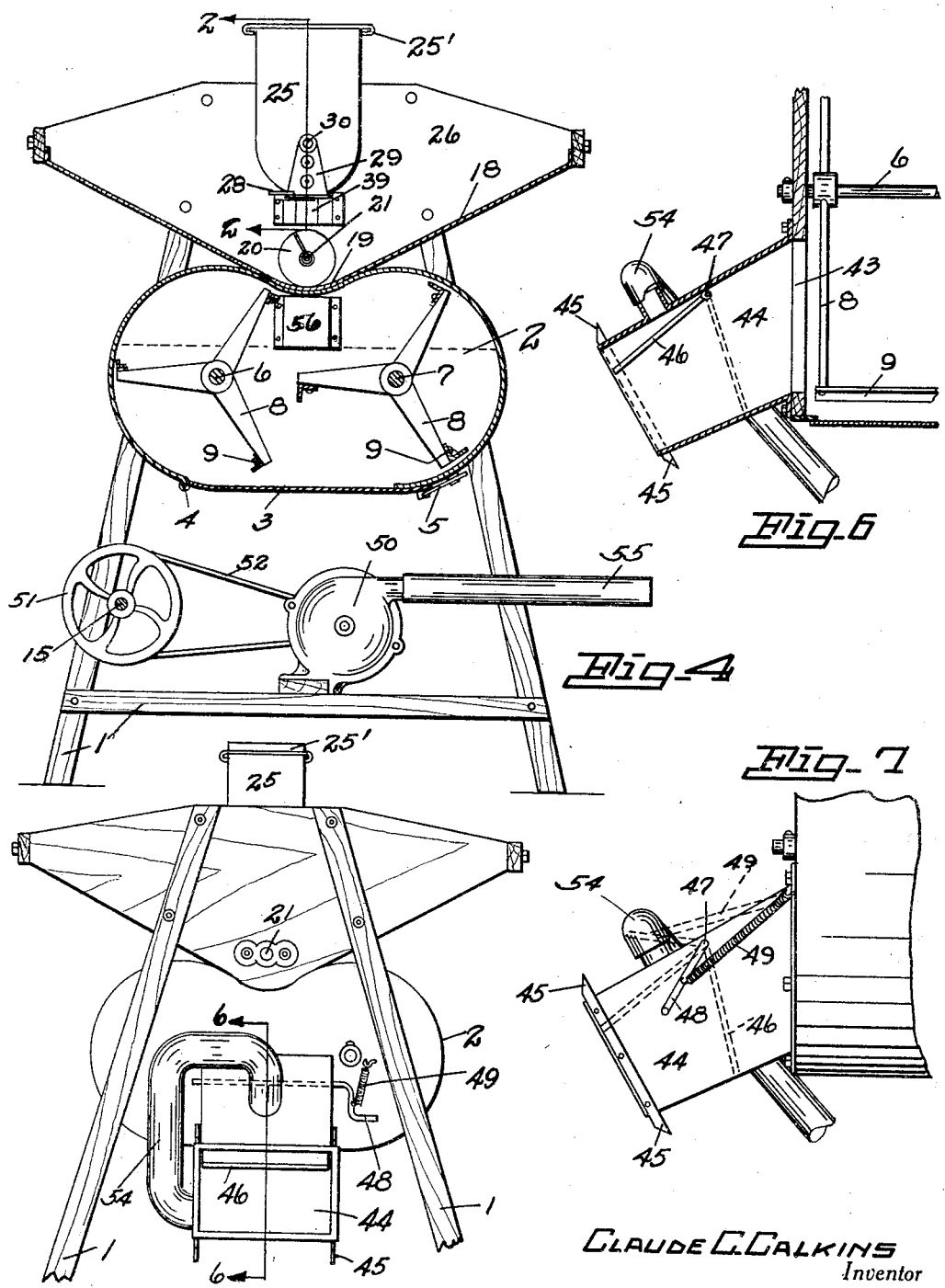

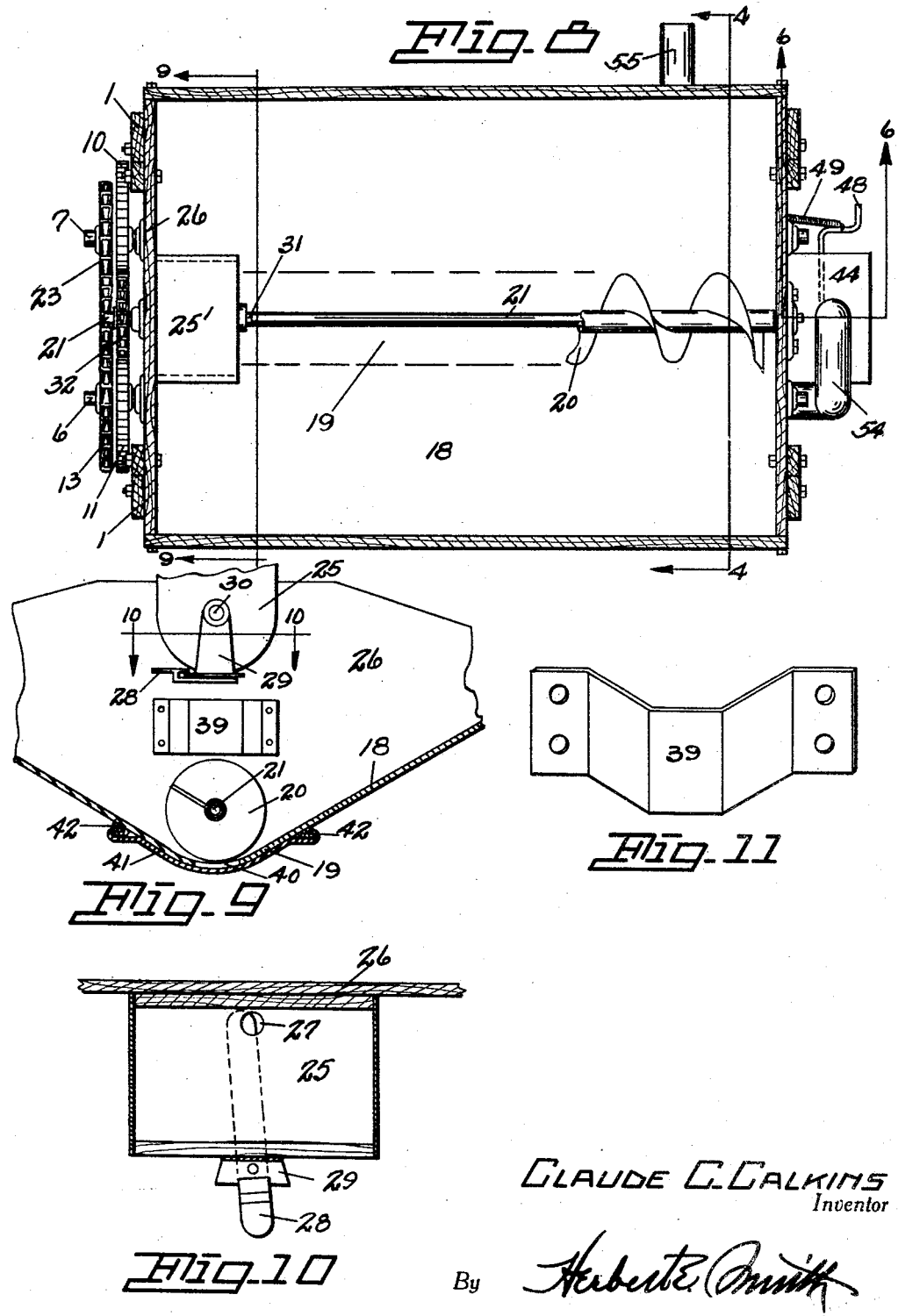

Patented Feb. 14, 1933

1,897,361

UNITED STATES PATENT OFFICE

CLAUDE C. CALKINS, OF SPOKANE, WASHINGTON

SEED TREATING MACHINE

Application filed February 3, 1930. Serial No. 425,503.

My present invention relates to improvements in seed treating machines for the elimination of smut and other diseases before the seed is planted. As is well known to those familiar with seed planting and growing of crops, the spores of smut accumulate on the surface of the grain, in the brush end and also in the cracks, where they lie dormant until after the grain is planted in the soil. The same moisture which causes the grain to sprout also causes the smut spores to germinate, the sprout of which attacks the plant seedling fastening its mycelial threads into the tissues of the growing plant where it remains feeding on the plant until the kernels are formed in the head at harvest time at which time the same fungus enters the newly formed kernel completely devouring it and making a smut ball instead of a kernel of wheat. In the process of threshing, these smut balls which contain as high as three or four million smut spores are broken and are scattered on the surface of the good grain, which in turn if planted without being killed reinfests the new sprout.

It is necessary to kill the smut spores without injuring the germ of the seed prior to planting in order to prevent the growth of the smut. Formerly the seed was immersed in formaldehyde or other solutions of sufficient strength to kill the smut spores, however, the strong solution penetrated into the germ of the seed killing large percentages and weakening others, thus greatly reducing yields. It has been determined that copper carbonate, ceresan, semesan and other fungicide dusts if applied to the seed in a manner so that the dust is actually ground into the coat of the same will carry on the seed into the soil at planting time. When sufficient moisture is available to germinate the seed, the fungicide dust will be brought into solution re-acting on the smut spores, killing them without injuring the germ of the seed.

As previously indicated, it has been determined that it is absolutely necessary that the fungicide which because of its cost is used in small quantities, approximating two ounces per bushel of seed grain, must be not only distributed throughout the seed, but actually fixed into the seed coat. This can only be accomplished by a continuous rubbing action and can best be accomplished where the fungicide and the seed to be treated are rubbed continuously together for a period of time.

Large warehouses, elevators and even large farm operators using seed in large quantities find it necessary to apply fungicide dusts rapidly and efficiently and my invention makes it possible to evenly distribute and apply these fungicide dusts to the coat of the seed to be treated at a rate of two hundred to three hundred bushels per hour, and the manner in which this is accomplished will be set forth hereafter.

In the physical embodiment of my invention I employ a stationary vessel or drum that is closed during the treating operation and the drum is equipped with rotary duplex agitators or mixers for setting up the co-related movements of the grain and copper carbonate as hereafter described.

The treating powder is fed to the drum with the grain in desired proportions, and the treated grain passes through the drum and is discharged into bags at the discharge end of the drum.

The invention consists in certain novel combinations and arrangements of parts as will hereinafter be more fully set forth. In the accompanying drawings I have illustrated one complete example of the physical embodiment of my invention wherein the parts of the machine are combined and arranged according to the best mode I have thus far devised for the practical application of the principles of my invention, and the machine has been satisfactorily efficient and commercially successful in the performance of its functions.

Figure 1 is a view in elevation at the feed end of the machine and showing the operating gears and connections.

Figure 2 is an enlarged detail vertical sectional view, at line 2—2 of Figure 4 showing the powder feeding box.

Figure 3 is an enlarged detail perspective view showing the agitator and stirrer for the interior of the head from which the treating powder is fed to the seed hopper.

Figure 4 is a vertical, cross sectional view, at line 4—4 of Figure 8.

Figure 5 is a view in elevation at the discharge end of the machine.

Figure 6 is an enlarged detail sectional view at the discharge end of the machine, as at line 6—6 of Figures 5 or 8.

Figure 7 is an exterior side view of the parts of Figure 6.

Figure 8 is a top plan view of the machine.

Figure 9 is a transverse vertical sectional view of parts of the machine at line 9—9 in Figure 8.

Fig. 10 is a sectional plan view taken on lines 10—10 of Fig. 9.

Figure 11 is a perspective view of a shield used with the feed of the seed treating powder.

The machine and its operating parts are supported in a main frame 1 of suitable construction, and I employ a stationary drum or vessel 2, having a flat bottom, concave top and rounded sides, and preferably of metal. The drum is fashioned with a drop bottom 3 that is hinged at 4 longitudinally of the drum, and the drop bottom may be opened, as indicated, in dotted lines Figure 1, to empty the drum, as for cleaning.

Within the stationary drum are two spaced, parallel agitator shafts 6 and 7 extending throughout the length of the drum and journaled in the main frame of the machine. Each shaft has mounted thereon an agitator or stirrer for the seed and grain, said agitators comprising spaced spider frames 8 and longitudinally extending slats 9 fixed at the outer peripheries of the spiders.

The agitator slats are preferably of angle iron bars and they are arranged to pick up the material from the lower portion of the drum, as the agitators revolve in the directions indicated by the arrows in Figure 4. Shaft 6 revolves clockwise and shaft 7 revolves anti-clockwise, and between the two agitators the material is lifted, tumbled, turned over and the seeds, by rubbing or attrition are cleansed in the presence of the powder. The powder is also caused to enter all cracks or openings in the grains because of the intimate rubbing and agitating of the material. In their rotary movements the agitators overlap, or pass through intersecting paths along the longitudinal center of the drum, thus insuring at the center of the drum the maximum treating operation for the grains. The material as it is commingled gradually passes from the feed end of the drum to the discharge end, and the continued addition of the material to the drum at the feed end causes a continuous flow of the material from the discharge end into bags.

For operating the agitator shafts I employ meshing gears 10 and 11 exterior of the drum, and the shaft 6 is driven through its sprocket wheel 12, chain 13, and a sprocket wheel 14 on the operating shaft 15 which is journaled in bearings of the frame below and at one side of the drum. The operating shaft has a drive pulley 16 and drive belt 17 suitably connected to supply the power for the machine.

The grain is fed to the drum at one end from an overhead hopper 18 which has a convex bottom 19 conforming to the concave top of the drum, and a screw conveyor 20 on shaft 21 in the bottom of the hopper feeds to the feed end. The screw conveyer is located at the longitudinal center of the hopper and the material flows down its inclined side walls to the bottom and from there the material is fed to the top of the drum at its longitudinal center.

The screw conveyer shaft 21 is revolved through the transmission means involving a sprocket wheel 22 on shaft 21, chain 23 and the sprocket wheel 24 on the driven agitator shaft 7, all located outside the drum.

As the seed grain is fed from the hopper to the drum, the seed treating powder, in proportionate quantity is added to the grain, and the supply of powder is fed by gravity from the powder box 25, having a closed top 25' and fixed at the inner side of one end 26 of the hopper.

The powder box has a round outlet port 27 in its bottom and the size of the opening of this port may be controlled by the use of an adjustable outlet gate 28 pivoted on a bracket 29 and located at the underside of the bottom of the box with its free end in position to close or partially close the outlet or feed port for the powder.

Within the lower portion of the box is located a combined stirrer or agitator, passing through the material to prevent packing, and also a wiper for clearing the feed port so that an even feed of powder may pass through the port. The stirrer and wiper are operated by a shaft 30 that is journaled in the walls of the powder box, and this feed shaft has a sprocket wheel 31 thereon driven by chain 32 from the sprocket wheel (not shown) on the shaft 21 of the screw conveyer.

Within the box the feed shaft 30 has a crank arm 33 secured thereto by a set screw 34, and this arm, which has a forked or bifurcated end 35 carries a wiper 36 of flexible material, as rubber. The crank arm is adjusted on the feed shaft so that the wiper shall pass across the port 27 as the feed shaft revolves and continuously clear the opening, as indicated in Figure 2.

A stirrer rod 37 is also carried by the crank arm 33 and the rod is clamped at 38 in one of the bifurcated jaws of the crank arm. The stirrer projects across the bottom of the box and rotates with the agitator or stirrer shaft 30 to stir up the powder, and prevent clogging of the material.

The powder thus passes freely through the port 27 and flows downwardly, back of a shield 39 that is secured to the face of the hopper wall 26 to prevent scattering of the powder, and the latter drops to the bottom of the hopper 18 in which is located the feed port 40 for both grain and powder from the hopper to the drum. The screw conveyer feeds the grain to the port 40 and the powder falls into the grain as it is passing through the port. The size of the opening of port 40 is governed by the use of a slide gate 41 that is supported in spaced grooves 42 on the bottom of the hopper, and this gate may be set to govern the predetermined, regulated flow of the material from the hopper into the drum.

At the opposite end of the drum is located the discharge port 43 in the lower portion of the vertical end wall of the drum, and an inclined discharge spout 44 is attached at the outer side of the drum wall, over the port, for discharge of the material. Hooks or hangars 45 are attached at the outer end of the spout for supporting the bags, and the material is fed through the port and spout to the bags, successively, of course.

While a loaded bag is being removed and replaced with an empty bag a cut-off gate 46 in the spout is closed. This gate, which is hinged at 47 to the top wall of the spout, is open while the material is running, as indicated in Figure 6, but is closed to cut-off the flow of material.

Outside of the spout the gate has a crank arm 48 to which is connected a snap spring 49 attached to the outer face of the drum, and this spring, as seen in Figure 7, and shown by dotted lines, is designed to snap the gate and hold it in either closed or open position.

A suction fan 50 is utilized to draw the excess dust from the spout and dispose of it in a suitable manner. The fan is operated from the shaft 15 by pulley 51, belt 52 and pulley 53, as seen in Figures 1 and 4.

The intake pipe 54 of the fan blower is connected to the discharge spout, and the discharge pipe 55 of the fan blower disposes of the dust. The dust may be blown into a condenser or other receptacle, and in this manner not only the excess or waste carbonate, after using, is disposed of, but the dust that has been separated from the grains is also disposed of in a sanitary manner.

An important feature of my construction may be found in the grain chute 56 secured to the head end of the drum 2 directly below the feed port 40. This chute leading down into the drum discharges the grain and powder from its lower end and determines the height to which the grain will fill the drum, the dotted line of Figure 4 at the bottom of the chute 56 indicating the desired surface of the grain being treated in order to secure the best results.

Having thus fully described my invention, what I claim as new and desire to secure by Letters Patent is:—

1. In a seed treating machine, the combination with a closed drum, a pair of spaced parallel shafts journaled therein and revolvable in opposite directions toward the longitudinal center of the drum, and agitators on said shafts, of a hopper above and extending the length of the drum, a gravity feed bottom in the hopper having a port to the drum, a longitudinally extending conveyer in the hopper discharging at said port, means located in position for co-operation with the gravity feed port for introducing a treating powder to the drum, and means for discharging the treated grain from the drum.

2. In a seed treating machine the combination with a closed drum, a pair of spaced parallel shafts journaled therein and revolvable in opposite directions toward the longitudinal center of the drum, and agitators on said shafts adapted to pass through intersecting planes at the longitudinal center of the drum, of a grain hopper above the drum having a gravity feed bottom and a port opening to the drum, a conveyer located in the hopper and discharging at said port, a powder feeding device having a port above the grain port, means for controlling the feed through both ports, and means for discharging treated grain from the drum.

3. In a seed treating machine, the combination with a drum and agitating means therein, of a hopper mounted above the drum and an inlet port between the hopper and drum, a powder box having a discharge port above the inlet port and means for feeding powder through the discharge port, independent means for regulating gravity flow of material through both ports, a shield mounted in the hopper between said ports and vertically spaced above said drum to form a feed passage for gravity flow of powder to the inlet port, and rotatable means for feeding grain to the inlet port beneath the shield.

In testimony whereof I affix my signature.

CLAUDE C. CALKINS.